(No Model.)
H. B. HILGEMAN.
PIPE.
No. 578,333.  Patented Mar. 9, 1897.
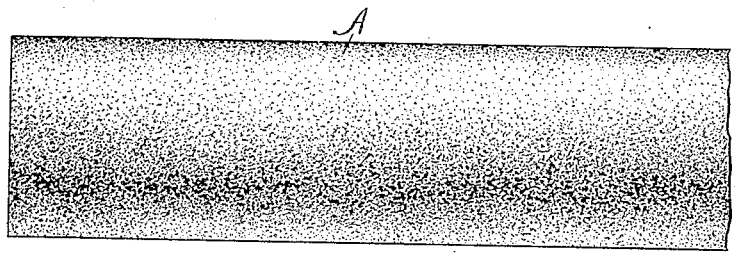
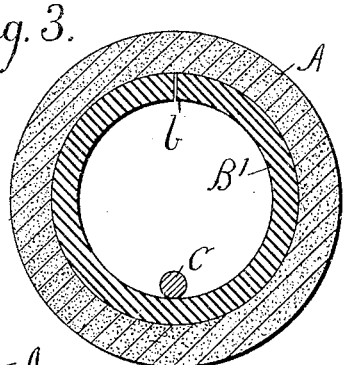
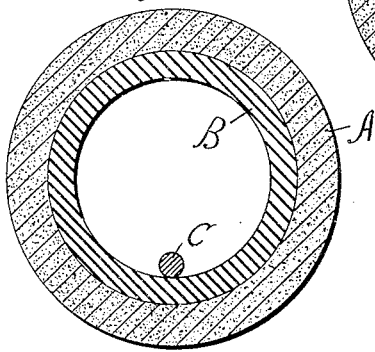
Witnesses
W. C. Alexander.
Austin L. McRae
Inventor
Henry B. Hilgeman
By Attorney
Benj. F. Nye

UNITED STATES PATENT OFFICE.

HENRY B. HILGEMAN, OF ST. LOUIS, MISSOURI.

PIPE.

SPECIFICATION forming part of Letters Patent No. 578,333, dated March 9, 1897.

Application filed December 10, 1896. Serial No. 615,111. (No model.)

*To all whom it may concern:*

Be it known that I, HENRY B. HILGEMAN, a citizen of the United States, residing at St. Louis, in the State of Missouri, have made a new and useful Improvement in Pipes, of which the following is a specification.

My invention relates to pipes adapted for conveying fluids and for use as conduits for conductors of electricity; and the chief object of my improvement is to provide a pipe that will be strong, cheap, durable, non-corrosible, and impermeable by liquids; that will not affect liquids passing through it or be affected by them; that will resist electrolytic action, and that will be a non-conductor of electricity and adapted for use as a conduit for conductors carrying currents. I attain that object by means illustrated in the accompanying drawings, in which—

Figure 1 is a side elevation of a section of pipe embodying my improvement. Fig. 2 is a vertical cross-section of said pipe on an enlarged scale, and Fig. 3 is a vertical cross-section of a pipe embodying a modification of my improvement.

Similar letters refer to similar parts throughout the several views.

A, Figs. 1, 2, and 3, represents an outer layer of cement, preferably hydraulic cement.

B, Fig. 2, represents a glass tube inclosed within the layer of cement. It is preferably a perfect tube closed on all sides, as shown, so as to prevent the escape through its sides of either liquids or electricity.

B', Fig. 3, is a glass lining differing from the tube B in containing a longitudinal split or crack *b* throughout its length.

The object in using a split lining is merely to cheapen the construction, and, as will be obvious, it is not essential that the crack *b* should be an open one, though it may be left as shown, if desired. In any case, however, the ingress and egress of liquids, if not otherwise avoided, are prevented by the outer layer A, of cement, surrounding the lining of glass. This form of pipe, though useful, is believed to be inferior to the form shown in Figs. 1 and 2.

C, Figs. 2 and 3, is a conductor of electricity.

The function of the lining of glass above described, in its preferred form, is to give the article the greatest possible smoothness, non-corrosibility, non-conductivity, and impermeability. The chief function of the surrounding layer of cement is to give the pipe strength to withstand the strains and blows to which it is liable to be subjected, and where a cement which is a non-conductor of electricity is used it also assists in making the pipe a perfect non-conductor.

Where I speak of the cement used surrounding the glass lining of my improved pipe, I mean surrounding the outer side of the lining.

My pipe may be manufactured in convenient open-ended lengths and the lengths coupled together when they are used by means of ordinary pipe-couplings, as will be obvious.

Though I prefer to make my pipe round in cross-section, no particular form in cross-section is essential.

I claim—

1. As a new article of manufacture, a pipe having a glass lining and a layer of cement surrounding the glass.

2. As a new article of manufacture a pipe having a glass lining and a layer of hydraulic cement surrounding the lining.

3. As a new article of manufacture, a pipe having a lining formed of a glass tube, and having a layer of cement surrounding the tube.

4. The combination of a conduit, composed of a glass lining coated with hydraulic cement, and a conductor of electricity within the conduit.

HENRY B. HILGEMAN.

Witnesses:
AUSTIN L. MCRAE,
BENJ. F. REX.